United States Patent [19]

Desai

[11] Patent Number: 4,778,087
[45] Date of Patent: Oct. 18, 1988

[54] DISPENSING PACKAGE

[75] Inventor: Kirit C. Desai, Perrysburg, Ohio

[73] Assignee: Owens-Illinois Closure Inc., Toledo, Ohio

[21] Appl. No.: 30,532

[22] Filed: Mar. 27, 1987

[51] Int. Cl.$^4$ ............................................. G01F 11/28
[52] U.S. Cl. .................................... 222/449; 222/450; 222/454
[58] Field of Search ............... 222/207, 213, 425, 450, 222/454, 449, 442

[56] References Cited

U.S. PATENT DOCUMENTS

| | | | |
|---|---|---|---|
| 2,083,156 | 6/1937 | McCabe | 222/207 |
| 2,873,050 | 2/1959 | Halverson | 222/450 X |
| 2,887,254 | 5/1959 | Menderman | 222/450 |
| 3,005,578 | 10/1961 | Mainieri | 222/450 |
| 3,036,742 | 5/1962 | Wagoner et al. | 222/450 X |
| 3,141,579 | 7/1964 | Medlock | 222/450 X |
| 3,141,580 | 7/1964 | Rogers | 222/213 |
| 3,175,736 | 3/1965 | Pelto | 222/450 X |
| 3,224,650 | 12/1965 | Willits, Jr. | 222/207 |
| 3,237,816 | 3/1966 | Anderson | 222/450 |
| 3,465,920 | 9/1969 | Brumfield | 222/450 X |
| 3,512,681 | 5/1970 | Frankel | 222/450 X |
| 4,105,142 | 8/1978 | Morris, Jr. | 222/450 X |
| 4,679,714 | 7/1987 | Blake | 222/449 |

FOREIGN PATENT DOCUMENTS 531864 8/1955 Italy ...................................... 222/454

Primary Examiner—Joseph J. Rolla
Assistant Examiner—Stephen B. Parker

[57] ABSTRACT

A dispensing package comprising a container having a neck with an external thread defining an opening and a closure comprising a base wall and a peripheral skirt having internal threads engaging the external threads on the neck of the container. An inner member has a peripheral flange engaging the neck of the container and interposed between the neck and the base wall of the closure. The inner member includes a measuring portion defining a cavity for a predetermined quantity of the contents of the material. The base wall is made of flexible and elastic material and an integral plunger extends axially from the underside of the base wall and has an enlarged end normally sealingly closing an inlet port in the inner member. A hinge top is provided that seals a dispensing opening in the base wall. When the base wall is flexed inwardly, the plunger moves out of sealing engagement with the inlet port and the container can be inverted to permit a predetermined quantity of the contents of the container to move into the cavity of the inner member. The base wall is then permitted to flex back to its original position. When the top is moved out of sealing engagement with the dispensing opening, the predetermined quantity of the contents can be dispensed through the opening in the end wall by tilting the container.

12 Claims, 4 Drawing Sheets

DISPENSING PACKAGE

This invention relates to dispensing packages and particularly to dispensing packages for dispensing a predetermined quantity of the contents of a container.

BACKGROUND AND SUMMARY OF THE INVENTION

Dispensing packages for dispensing a predetermined quantity of the contents of the container are shown, for example, in U.S. Pat. Nos. 3,005,578, 3,141,579, 3,175,736, 3,224,650, 3,237,816, 3,036,742, 4,105,142, 3,465,920, 2,887,254, 3,512,681, and 2,873,050. In U.S. Pat. No. 3,237,816, a type of dispensing package is shown wherein the closure includes an outer skirt and an inner skirt and has a base wall from which a plunger projects downwardly into the bottle for sealingly engaging a portion of the container. When it is desired to dispense a predetermined quantity of the material, the hinge top is opened and the central portion of the closure depressed and the contents can enter beneath the base wall of the closure when the container is inverted. Such an arrangement comprises a plurality of parts, tight tolerances to prevent leakage while dispensing, and requires two hands, one to hold the container and the other to rotate the closure.

Accordingly, among the objectives of the present invention are to provide a dispensing package for dispensing a predetermined quantity of the contents of a container without the use of tools; which can be operated with one hand; which does not require removal of the closure; which can be readily adapted to include a tamper indicating device; and which can handle both liquid and dry products.

In accordance with the invention, the dispensing package comprising a container having a neck with an external thread defining an opening and a closure comprising a base wall and a peripheral skirt having internal threads engaging the external threads on the neck of the container. An inner member has a peripheral flange engaging the neck of the container and interposed between the neck and the base wall of the closure. The inner member includes a measuring portion defining a cavity for a predetermined quantity of the contents of the material. The base wall is made of flexible and elastic material and an integral plunger extends axially from the underside of the base wall and has an enlarged end normally sealingly closing an inlet port of the inner member. A hinge top is provided that seals a dispensing opening in the base wall. When the base wall is flexed inwardly, the plunger moves out of sealing engagement with the inlet port and the container can be inverted to permit a predetermined quantity of the contents of the container to move into the cavity of the inner member. The base wall is then permitted to flex back to its original position. When the top is moved out of sealing engagement with the dispensing opening, the predetermined quantity of the contents can be dispensed through the opening in the base wall by tilting the container.

DESCRIPTION

Figure 1:
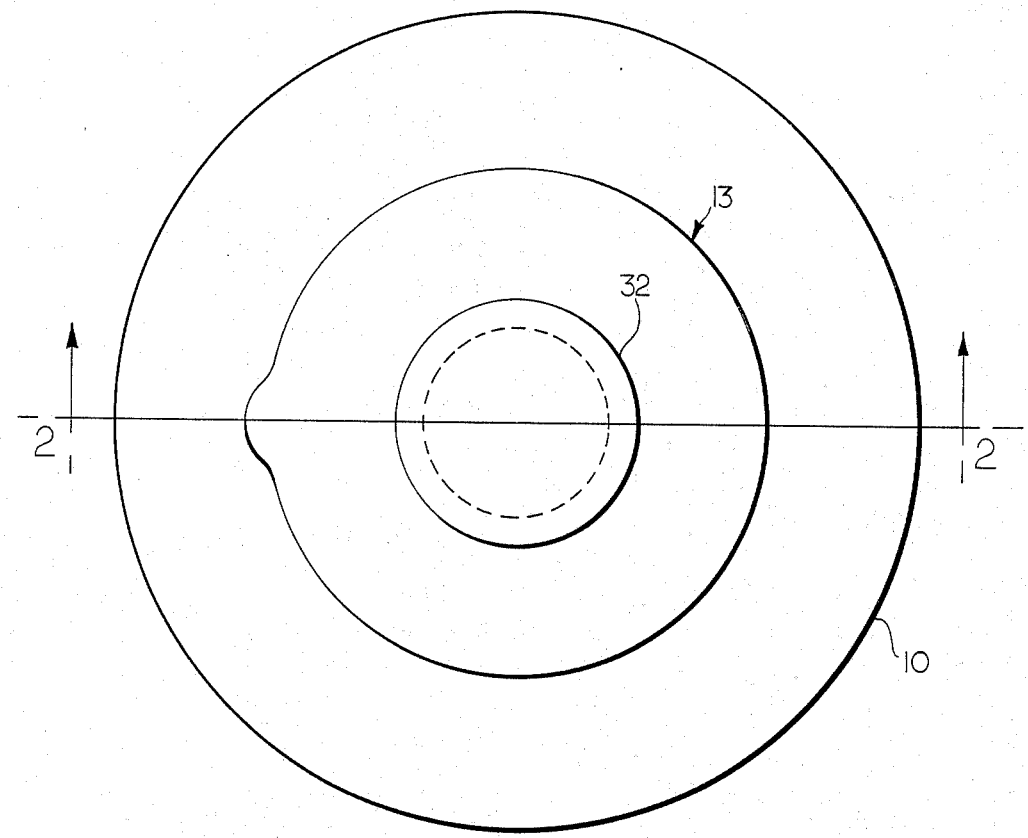
FIG. 1 is a plan view of a dispensing package embodying the invention.
Figure 2:
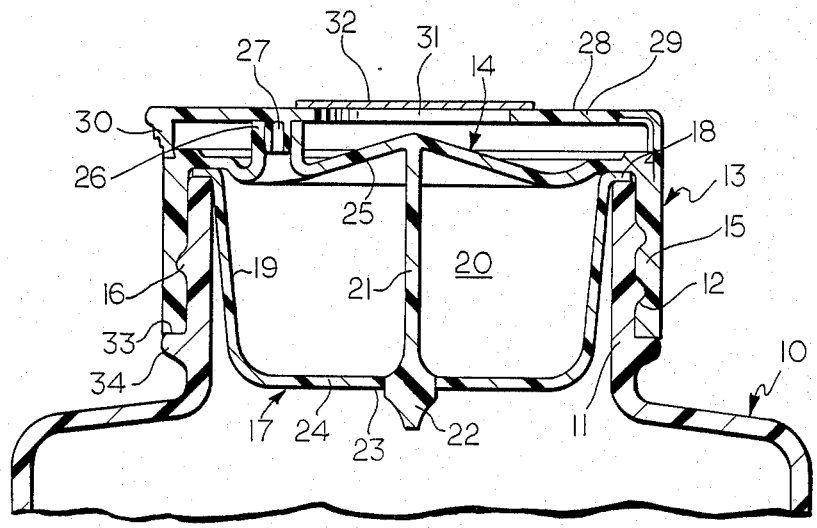
FIG. 2 is a fragmentary sectional view taken along the line 2—2 in FIG. 1.
Figure 3:
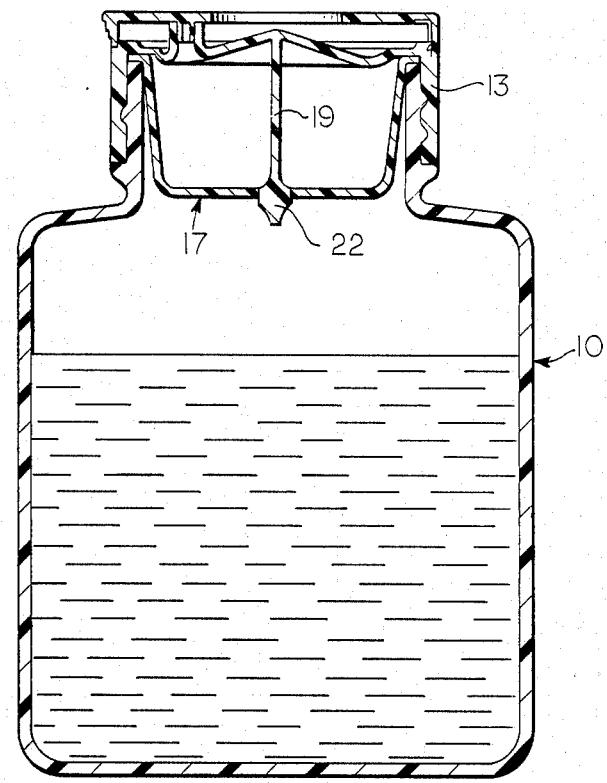
FIG. 3 is a sectional view of the package prior to dispensing the contents.

Referring to FIGS. 1 and 2, the dispensing package comprising the invention includes a container 10, preferably made of plastic such as polyethylene or polypropylene, and having a neck 11 with an external thread 12. The package further includes a closure 13, made of plastic such as polypropylene, having a base wall 14 and a peripheral skirt 15 with an internal thread 16 engaging the external thread 12 on the neck 11 of the container 10. Alternatively, other means can be provided interengaging the closure and container such as a snap-on bead on the skirt of the closure engaging an annular groove on the outer surface of the neck of the container.

An inner member 17, made of plastic such as olefin or EVA copolymer which is elastic and flexible, is provided and has a peripheral flange 18 and a cup-shaped portion 19 extending axially within the neck to define a volume 20 for receiving a predetermined quantity of the contents of the container, as presently described. The flange 18 engages the free end of the neck 11 of the container and is preferably attached to the neck of the container as by ultrasonic bonding. The central portion of base wall 14 of the closure 13 is of sufficient thickness and flexibility so that it can be flexed axially and includes an integral axially extending plunger 21 having an enlarged portion 22 sealingly engaging outlet port 23 in the base wall 24 of the inner member 17.

Figure 4:
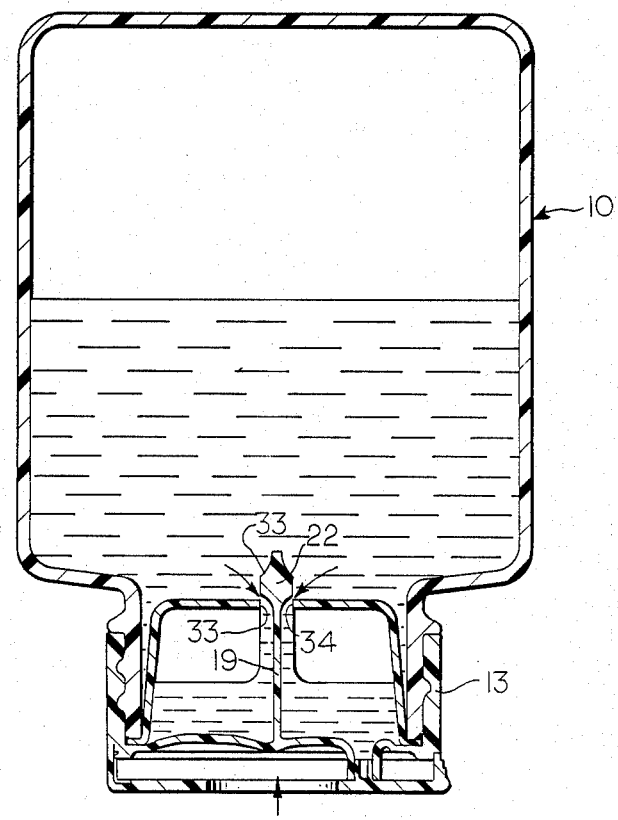
FIG. 4 is an inverted view of the package showing the flow of a predetermined quantity of the contents into the measuring area.

By flexing the wall 14 axially with the thumb or finger and inverting the container as shown in FIG. 4, a predetermined quantity of the contents will fill the chamber 20.

In order to facilitate engagement of the thumb or finger, the central portion 25 of the base wall 14 is bowed or concave upwardly, for example, conical in configuration and extends axially outwardly relative to the container. The periphery of wall 25 is preferably thickened and engages flange 18. The base wall 14 includes an integral tube defining a dispensing port 26 adjacent its periphery which is engaged by a plug 27 on the wall 28 of a hinge cover 29 which is hinged to the closure at the juncture of the base wall 14 and skirt 15. A finger engaging thickened portion 30 is provided on cover 29 diametrically opposite the hinge to facilitate opening of the cover 29. A central opening 31 in wall 28 provides access to the flexible portion of the base wall 14 and is normally covered initially by a thin frangible tamper indicating wall 32 adhered to the upper surface of the hinged cover 29.

The side wall 33 of the plunger 21 is cylindrical and engages the cylindrical surface 34 of outlet port 23.

Although the cover 29 is preferably hinged to closure 13, it can be a separate removable cover.

Figure 5:
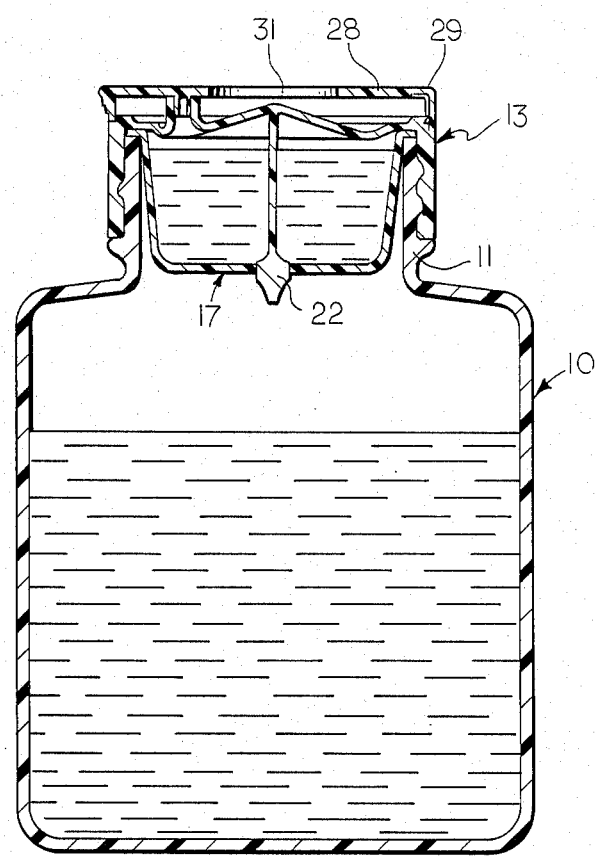
FIG. 5 is a sectional view of the package showing the measured quantity of the contents in position for dispensing.
Figure 6:
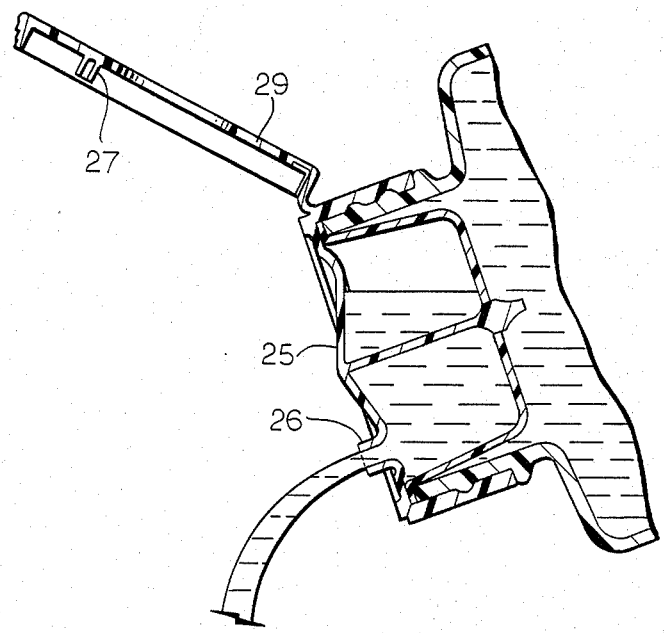
FIG. 6 is a fragmentary view showing the dispensing of the contents.

Referring to FIGS. 3-6, when it is desired to dispense the contents, the tamper indicating wall 31 is removed and the container is inverted while depressing the base wall 14 to cause the contents to enter the chamber 20 until a predetermined quantity is provided filling the chamber. The base wall 14 is then released as shown in FIG. 5. When it is desired to dispense the contents, the hinged cover 29 is moved out of position and the container is tilted permitting the predetermined quantity of contents to be dispensed through the dispensing opening 26 as shown in FIG. 6.

Where the contents need to be protected, the closure can be sealed to the container as by ultrasonic welding at 33 at the juncture of the free edge of the skirt 15 and an annular flange 34 on the container.

Figure 7:
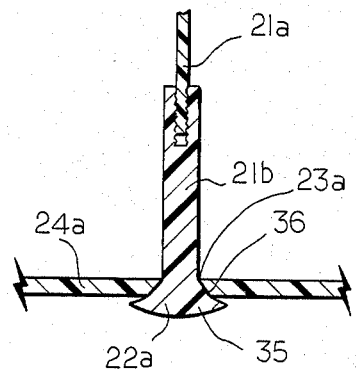
FIG. 7 is a fragmentary view of a modified form of the package.
Figure 9:
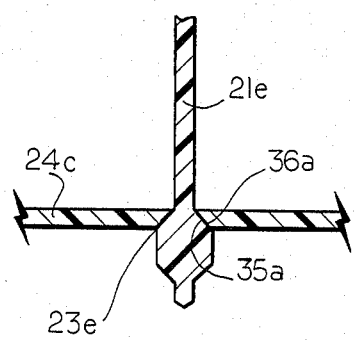
FIG. 9 is a fragmentary view of a further modified form of the package.

In the form shown in FIG. 7, the plunger is made of two pieces 21a, 21b so that the enlarged head 22a of the part 21b can be applied after the inner member is positioned on the inside of the closure by threading the internal thread on the portion 21b with the thread on the lower end of the portion 21a. In this form, the plug 22a has a tapered surface 35 that engages a complementary tapered surface 36 on the inner surface of port 23a in wall 24. The wall 25 of the closure urges the surfaces 35, 31 into sealing engagement to provide a liquid tight seal which can be used when the contents are not granular or not highly viscous. Similar surfaces 35a, 36a can be applied to the integral plunger 21e, as shown in FIG. 9. In this form, the plunger is snapped through opening 23e and tension is provided by wall 25 to hold the surfaces in sealing engagement.

Figure 8:
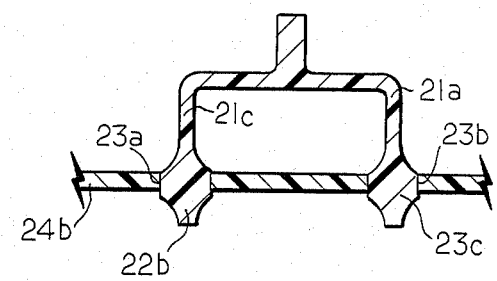
FIG. 8 is a fragmentary view of a further modified form of the package.

Referring to FIG. 8, where air entrapment may become a problem due to the nature of the contents in the container, dual plungers 21c, 21d can be provided on a single central plunger, each supporting an enlarged portion 22b, 22c which cooperates with a respective opening 23b, 23c.

It can thus be seen that there has been provided a dispensing package which dispenses a predetermined quantity of the contents of a container without the use of tools; which can be operated with one hand; which does not require removal of the closure; which can be readily adapted to include a tamper indicating device; and which can handle both liquid and dry products.

I claim:

1. A dispensing package comprising
a container having a neck,
and a closure comprising a base wall having a dispensing opening,
and a peripheral skirt,
interengaging means between said neck and closure for holding said closure on said container,
an inner member having a peripheral flange engaging the neck of the container and interposed between the neck and the closure,
said inner member including a measuring portion defining a cavity for a predetermined quantity of the contents of the material to be dispensed,
said inner member having an inlet port,
said base wall of said closure being made of sufficiently flexible and elastic material so that it can be deflected by a finger,
and a plunger extending axially from the underside of the base wall and having an enlarged end normally sealingly closing said inlet port in said inner member,
a removable cover hinged to said closure and normally sealing said dispensing opening in said base wall,
said cover having an opening whereby said base wall may be flexed by the finger of a user when the cover is on the container such that when the base wall is flexed inwardly, the plunger moves out of sealing engagement with the inlet port and the container can be inverted to permit a predetermined quantity of the contents of the container to move into the cavity of the inner member, and when the base wall is then permitted to flex back to its original position, the predetermined quantity is retained and when the cover is thereafter moved out of sealing engagement with the dispensing port, the contents can be dispensed by tilting the container.

2. The dispensing package set forth in claim 1 including an integral hinge connecting said cover and said closure.

3. The dispensing package set forth in claim 1 wherein said plunger is formed integrally with said base wall of said closure.

4. The dispensing package set forth in claim 1 wherein said plunger and said inlet port on said inner member have complementary tapered sealing surfaces.

5. The dispensing package set forth in claim 1 wherein said inner member has a second inlet port, said plunger having a second enlarged end normally sealingly closing said second inlet port.

6. The dispensing package set forth in claim 1 wherein said inner member has a side wall, and graduated indicia on said side wall for indicating the quantity of the contents of the material to be dispensed.

7. A dispensing closure for a container having a neck comprising
a base wall having a dispensing opening,
and a peripheral skirt,
interengaging means on the closure for holding said closure on the neck of a container,
an inner member having a peripheral flange adapted to engage the neck of the container and adapted to be interposed between the neck and the closure,
said inner member including a measuring portion defining a cavity for a predetermined quantity of the contents of the material to be dispensed,
said inner member having an inlet port,
said base wall of said closure being made of sufficiently flexible and elastic material so that it can be deflected by a finger,
and a plunger extending axially from the underside of the base wall and having an enlarged end normally sealingly closing said inlet port in said inner member,
a removable cover hinged to said closure and normally sealing said dispensing opening in said base wall,
said cover having an opening whereby said base wall may be flexed by the finger of a user when the cover is on the container such that when the base wall is flexed inwardly, the plunger moves out of sealing engagement with the inlet port so that when a container to which the closure is attached is inverted to permit a predetermined quantity of the contents of the container will move into the cavity of the inner member, and when the base wall is then permitted to flex back to its original position, the predetermined quantity is retained and when the cover is thereafter moved out of sealing engagement with the dispensing port, the contents can be dispensed by tilting the container.

8. The dispensing closure set forth in claim 7 including an integral hinge connecting said cover and said closure.

9. The dispensing closure set forth in claim 7 wherein said plunger is formed integrally with said base wall of said closure.

10. The dispensing closure set forth in claim 7 wherein said plunger and said inlet port on said inner member have complementary tapered sealing surfaces.

11. The dispensing closure set forth in claim 7 wherein said inner member has a second inlet port, said plunger having a second enlarged end normally sealingly closing said second inlet port.

12. The dispensing closure set forth in claim 7 wherein said inner member has a side wall, and graduated indicia on said side wall for indicating the quantity of the contents of the material to be dispensed.

* * * * *